Aug. 29, 1939.   H. W. CASE   2,170,808
INTEGRAL TAIL WHEEL AND RUDDER FOR AIRPLANES
Filed June 10, 1937   3 Sheets-Sheet 1
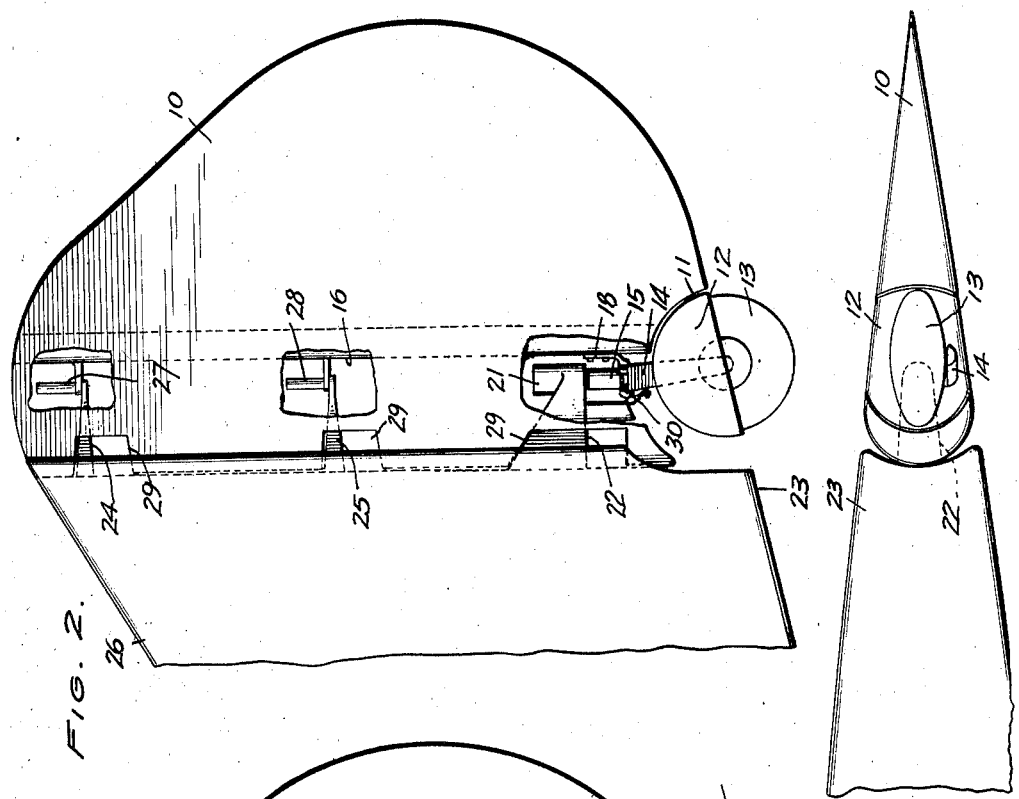
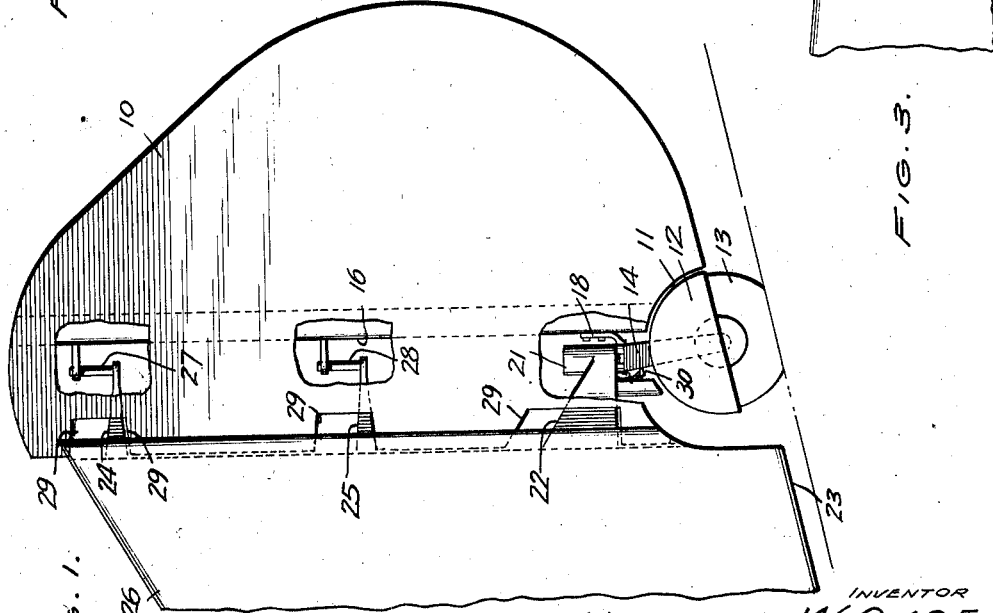
INVENTOR
HAROLD W. CASE
BY
ATTORNEYS

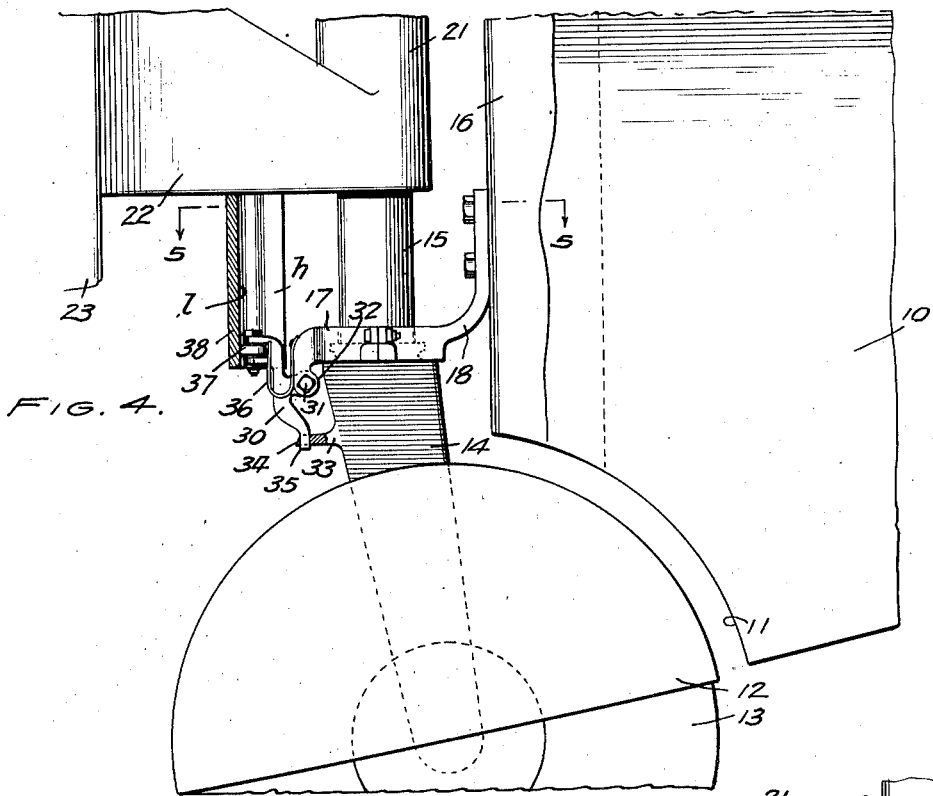
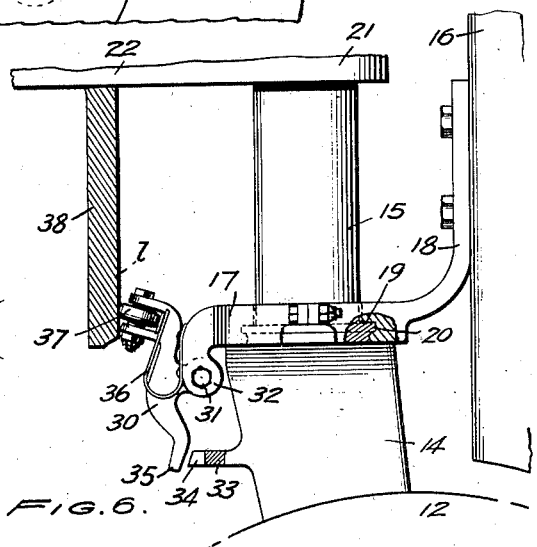

Aug. 29, 1939.   H. W. CASE   2,170,808
INTEGRAL TAIL WHEEL AND RUDDER FOR AIRPLANES
Filed June 10, 1937   3 Sheets-Sheet 3
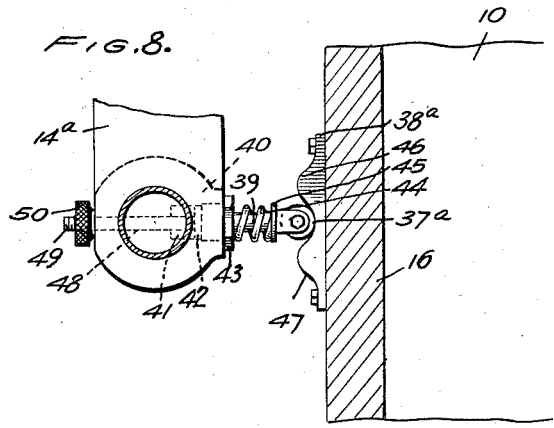
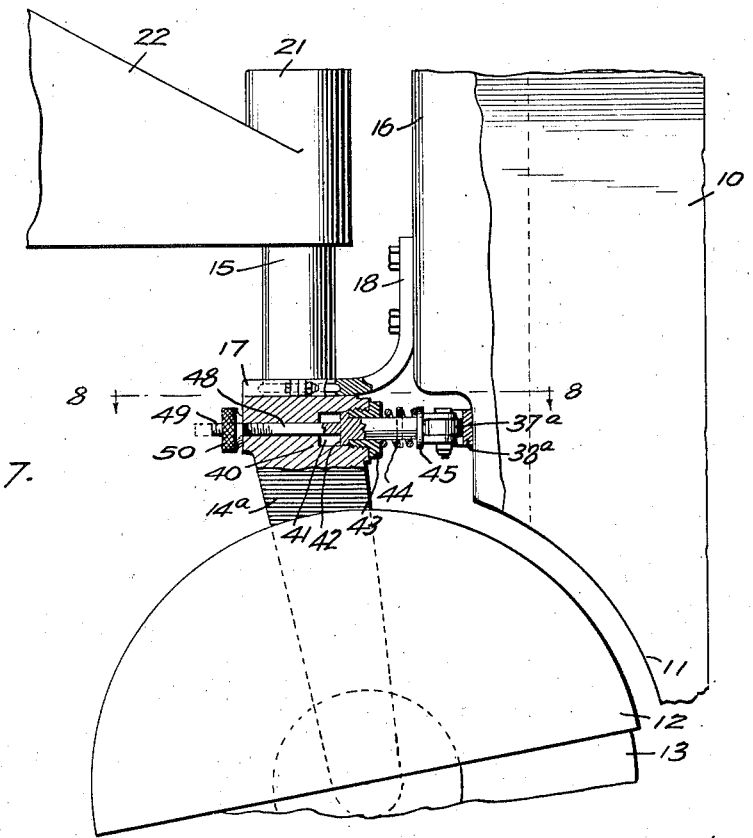
INVENTOR
HAROLD W. CASE
BY
ATTORNEYS Patented Aug. 29, 1939

2,170,808

UNITED STATES PATENT OFFICE 2,170,808

INTEGRAL TAIL WHEEL AND RUDDER FOR AIRPLANES

Harold W. Case, Dayton, Ohio

Application June 10, 1937, Serial No. 147,513

14 Claims. (Cl. 244—109)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in tail wheel installations for aircraft and the objects of the improvements are to provide, first: a tail wheel installation which is simple and neat in design, strong and light with the minimum resistance to airflow and easily accessible for inspection and repair in the field, and, second: a tail wheel installation which is particularly desirable for training airplanes and which makes possible a greater landing angle for a given type of fuselage and front landing gear.

The above objects are attained by a novel combination of tail wheel and airplane rudder in which the tail wheel is installed within and made integral with the rudder in such a manner that any movement of the tail wheel oleo piston will cause an equal movement of the rudder, along its hinge center line, with respect to the airplane fuselage or rudder supporting members. The tail wheel fork and consequently the tail wheel are attached to and move with the rudder throughout the normal limited range of rudder motion required for directional control and beyond this range an automatic throw-out mechanism operates to disconnect the tail wheel and fork from the rudder, thus allowing the tail wheel to swivel through 360 degrees.

Additional objects and advantages of the improvements may be apparent in the following detailed description of the invention and in the accompanying drawings, wherein:

Figure 1 is a side view of the improved integral tail wheel and rudder installation shown applied to a conventional airplane fuselage with the tail wheel oleo fully compressed.

Figure 2 is a somewhat similar view of the same parts illustrated in Figure 1 but showing the tail wheel oleo in the fully extended or flying position.

Figure 3 is a bottom plan view of the parts shown in Figure 2.

Figure 4 is an enlarged detail view of the lower portion of the tail wheel and rudder installation, showing the throw-out mechanism in wheel-and-rudder locking position.

Figure 5 is a horizontal section on line 5—5 of Figure 4 to show the normal and abnormal range of rudder motion.

Figure 6 is a vertical section on line 6—6 of Figure 5, showing the throw-out mechanism in wheel-releasing position.

Figure 7 is a side view of a modified embodiment of the invention, and

Figure 8 is a section on line 8—8 of Figure 7.

In conventional tail wheel installations, except where unnecessarily large portions of the fuselage are cut out, the tail wheel during flight protrudes below the body of the fuselage at a distance equal to the tail wheel diameter plus the maximum oleo travel plus sufficient clearance between the tail wheel and the bottom of the fuselage. The parasite resistance of the tail wheel installation is, therefore, comparatively large especially when the tail wheel mounting is rigid or non-retractable. In retractable tail wheel installations, the retracting mechanism adds weight to the airplane and increases the maintenance work considerably.

In the proposed installation forming the subject matter of the present invention only about one-half of a streamlined wheel protrudes below the airplane and the tail wheel cowling is a part or continuation of the rudder surface. An advantage of this arrangement is that it offers less resistance to airflow than the conventional type of tail wheel installations. To this end, the airplane rudder 10 has a semi-circular cut-out 11 in its leading bottom portion to accommodate the semi-circular cowling or fairing 12 which houses the upper half of the streamlined tail wheel 13. The wheel is supported by and moves with the tail wheel fork or knuckle 14 which is directly connected to or made integral with an oleo piston 15. The latter is concealed by the covering of the rudder, being located within the space between the vertical leading edge of the rudder and the rudder spar 16 which is set back from the leading edge as illustrated. The tail wheel and rudder are connected together by a bearing bracket or yoke in two complementary parts 17 and 18 jointly providing a bearing in which the oleo piston and hence, the tail wheel, is free to turn. Positive connection between the piston and the bearing yoke in the direction of the rudder hinge is assured by means of a thrust collar 19 integral with the piston and engaging a groove 20 in the bearing as shown in Figure 6; the part 17 of the yoke being bolted or otherwise attached to the rudder spar and the part 18 of the yoke being connected to part 17 to complete the bearing.

The oleo piston cylinder 21 is made an integral part of the rudder lower hinge bracket 22 which is attached to the fuselage 23 and takes all the loads from the tail wheel in landing. The turning of the oleo piston 15 in its cylinder 21 provides the necessary hinge action for the lower portion of the rudder. Other hinge brackets 24 and 25 are fastened to the fuselage body 23 and integral fin 26 to support the hinges 27 and 28 at the top and intermedial portions respectively of the rudder. Hinges 27 and 28 are designed however, to allow an up and down movement of the rudder equivalent to the corresponding movement of the oleo piston. The rudder can be turned, of course, at the same time that it is being displaced vertically with respect to the body of the fuselage and cut-outs 29 in the rudder provide the necessary clearance with the rudder hinge brackets on the fuselage while the rudder is being turned during any degree of oleo-and-rudder deflection. The bearing bracket or yoke, 17 and 18, provides a bearing support for the lower part of the rudder 10 when the tail wheel is in contact with the ground and the interlocking connection between the tail wheel and the rudder provided by the thrust collar 19 of the oleo piston and the groove 20 of the yoke ensures positive motion of the tail wheel and rudder as the oleo deflects. The tail wheel fork or knuckle 14 is illustrated as being inclined so that some castor is given the tail wheel. Other tail wheel forks may be used, however, where no castor is provided, i. e., where the centerline of the tail wheel axle lies on the rudder hinge line.

The tail wheel is connected to the rudder, to be steered therewith throughout the normal range of rudder motion required for directional control, by a locking device which includes a throw out mechanism for disconnecting the tail wheel from the rudder and allowing the tail wheel to swivel through 360 degrees.

In the type of locking device illustrated in Figures 1 to 6 inclusive, a locking lever or arm 30 has swinging movement in a vertical plane about an intermediate horizontal axis or pivot 31 supported by and between depending bearing lugs 32 which are integral with the yoke part 17. The tail wheel knuckle 14 has an integral horizontal extension 33 provided with a notch 34 into which the end 35 of the lower arm of the locking lever is normally thrust by the force of the lever-tensioning spring 36 acting against the upper arm of the lever, as clearly shown in Figure 4. In this condition of the locking device the tail wheel is steerable and moves with the rudder. The upper arm of the locking lever carries a cam follower, such as a horizontally disposed roller 37, adapted to travel over the arcuate cam-surface of a cam 38 fixed to and depending vertically from the rudder lower hinge bracket 22. The spring 36 insures contact between the cam follower 37 and the cam 38 at all times within the range of rudder motion. Throughout the normal range of rudder motion required for directional control, etc., the cam follower 37, travels over the low part L of the cam and the end 35 of the locking lever is engaged in the notch 34 of the tail wheel assembly. Throw out or disconnection of the tail wheel with respect to the rudder occurs just before the rudder reaches its maximum movement on either side of its central or neutral position when the cam follower moves up on a high part, H or H' of the cam. Movement of the cam follower upon a high part of the cam 38 causes the locking lever 30 to turn about its axis and to withdraw the end 35 from the locking notch 34 thereby disconnecting the tail wheel knuckle 14 from the rudder yoke 17. The tail wheel 13 is then free to spin or turn about the axis of the oleo piston 15 which is also the hinge line of the rudder. As long as the rudder is held in its extreme position on either side of neutral, the tail wheel is free to spin about its axis. During take off and landing, the tail wheel knuckle 14 is locked to the rudder 10 thus permitting the wheel to be steered through its connection with the rudder. However, when taxiing or when the airplane is being moved around in the hangar or on the flying field by the ground crew, the rudder is swung to an extreme position to actuate the throw out mechanism and permit the tail wheel to swivel through 360 degrees; the free movement of the tail wheel facilitating the handling of the airplane.

In the modification disclosed in Figures 7 and 8, the throw out cam 38a is carried by the rudder spar 16 and the cam follower 37a is mounted in the tail wheel knuckle 14a. The cam follower, which may be a roller, is journaled in the outer end of a plunger 39 which extends horizontally between the cam 38a and the confronting side of the tail wheel knuckle 14a which has a thickened portion 40 recessed at 41 to receive the inner end of the plunger. The plunger is slidable between the cam and the tail wheel knuckle and at its said inner end is provided with a flange or disk 42 having a slide bearing on the walls of the recess. The outer end of the recess 41 is closed by a packing screw 43 which serves also as an abutment for the disk 42. A helical spring 44 encircles the plunger 39 with one end bearing against the screw 43 and its other end bearing against a thrust collar 45 forming an integral part of the plunger. The tension of the spring 44 is such as to yieldably hold the plunger projected from the recess 41 to the limit of its movement as determined by the abutment of the disk 42 with the screw 43. The cam 38a is located within a cut-out in the lower end of the rudder spar below the yoke 17 and 18 and is provided with two lobes 46 and 47 between which the cam follower 37a is held by the pressure of the spring 44 unless a given turning force is applied to the tail wheel 13 about the center-line of the tail wheel oleo piston 15. If this occurs against the movement of the rudder 10 when the cam follower 37a will be dislodged from between the lobes of the cam and the tail wheel 13 will be free to swivel through 360 degrees. However, as soon as almost one complete swiveling turn is made about the axis of the oleo the cam follower will roll up on one lobe or the other of the cam and will again seat itself between the two lobes of the cam to thereby reestablish a connection between the rudder 10 and the tail wheel 13 permitting steering the tail wheel through the rudder. In case it becomes desirable to disconnect the tail wheel knuckle from the rudder and thus render the tail wheel free to swivel for a definite period, this can be accomplished by a manually actuated throwout mechanism. This mechanism consists of an adjusting stem 48 having a slide bearing in a small bore leading forwardly from the inner end of the recess 41 and outwardly of the front or leading side of the tail wheel knuckle 14a. The stem 48 is attached or made integral at its inner end to the plunger disk 42 and projects slightly beyond the bore at its opposite or free end which is screw threaded as shown at 49 and carries an adjusting hand nut 50 bearing against the side of the tail wheel knuckle. By turning the hand nut to cause the plunger 39 to be moved inwardly of the recess 41 against the resistance of the spring 44, the cam follower 37a will be withdrawn from the cam 38a and held out of the path thereof while the tail wheel is swiveling through 360 degrees. This is desirable when the ground crew moves the airplane about.

From the foregoing it will be seen that the invention herein provides an improved tail wheel installation having material advantages over tail wheel installations of conventional types. Although some weight is added in the extreme end of the fuselage to support the tail wheel loads on the rudder lower hinge bracket, the novel design and construction of the part is such as to provide, in general, a lighter tail wheel installation and a greater saving in weight especially in comparison with the conventional retractable tail wheel and its troublesome retracting mechanism. The improved installation, is particularly adapted to and desirable for a training airplane because, by reason of its provision of a steerable and free-swiveling tail wheel, the chances for ground looping are materially decreased.

Having thus described the invention, what I claim is:

1. In an aircraft, a fuselage, an air rudder, a vertically disposed hinge connecting the fuselage and the rudder and providing for movement of the rudder along the axis of the hinge with respect to the fuselage, an oleo cylinder fixedly attached to the fuselage below the hinge and having its axis in coincidence with the axis of the hinge, an oleo piston in the cylinder and having a swivel connection with the rudder, and a tail wheel integrally connected with said oleo piston.

2. In an aircraft, a tail wheel and an air rudder mounted for movement longitudinally of and angularly about a common axis and connected together by a swivel whereby the longitudinal movement of the one is transmitted to the other and by a releasable connection whereby the angular movement of the one is transmitted to the other, and means for releasing the releasable connection to free the one from the other for separate independent angular movement of both.

3. In an aircraft, a fuselage, a vertical rudder, a vertical oleo cylinder fixedly attached to the lower portion of the tail end of the fuselage, an oleo piston in the said cylinder and having a swivel connection with the said rudder at the lower portion thereof and in line with the hinge axis of the rudder whereby movement of the piston axially in the cylinder causes an equal vertical movement of the rudder with respect to the fuselage, said piston being free to turn within the cylinder and serving as a hinge for the lower portion of the rudder, additional co-axial hinge-connections between relatively upper portions of the fuselage and the rudder and providing for axial movement of the rudder equivalent to the movement of the oleo piston, and a tail wheel integral with the said piston.

4. In an aircraft, a vertical rudder, a tail wheel having a swivel connection with the rudder axially aligned with the hinge axis of the rudder, means for locking the tail wheel and the rudder against relative swivelling movement to provide for steering the tail wheel through operation of the rudder, said locking means including interengaging members carried by the rudder and tail wheel respectively, and means operable for separating the members to free the tail wheel for swiveling movement with respect to the rudder.

5. In an aircraft, a vertical rudder, a tail wheel support closely adjacent to and having a swivel connection with a lower portion of the rudder, said swivel connection being axially aligned with the hinge axis of the rudder, and a cam-actuated detent active only over a preselected portion of the range of rudder movement to lock the rudder and the tail wheel support together to provide for steering the tail wheel support with the rudder, the tail wheel support being free to swivel with respect to the rudder through 360 degrees when the rudder is moved beyond the said preselected portion of its range.

6. In an aircraft, the combination with the fuselage and vertical rudder thereof, a tail wheel support connected with the rudder by a swivel having its axis in coincidence with the hinge axis of the rudder, a detent comprising a movable locking arm attached to the rudder and engaging in a locking notch in the tail wheel support to lock the latter against swiveling movement with respect to the rudder, and a throw-out mechanism for releasing the detent to permit the tail wheel support to swivel with respect to the rudder, said mechanism including a cam follower on the locking arm and a member fixed to the fuselage and having a camming surface acting against the follower to effect the release of the detent at preselected points in the range of rudder movement.

7. In an aircraft, a fuselage, a rudder, a hinge connection between the fuselage and the rudder comprising an oleo cylinder fixedly attached to the fuselage and an oleo piston operating in said cylinder and having a swivel connection with the said rudder, ground-engaging means including a support integrally connected with the oleo piston, releasable means for locking the support against swiveling movement with respect to the rudder including a pair of relatively interlocking members one of which is carried by the rudder and the other of which is carried by the support, and means for disengaging the members.

8. In an aircraft, a fuselage, a rudder hinge bracket attached to the fuselage and having an oleo cylinder integral therewith, an oleo piston slidable and turnable in said cylinder to serve as a rudder hinge, a rudder, a yoke secured to the rudder and having a swivel connection with the oleo piston, ground-engaging means including a support integral with the said piston and having a locking notch, a pivotally mounted locking arm carried by the said yoke with one end disposed to engage in the said locking notch of the support, a roller at the opposite end of the arm, a tension means normally holding the arm tilted about its pivot with the said one end engaged in the said locking notch to hold the support against swiveling movement with respect to the rudder, and a cam member fixed to the rudder hinge bracket and presenting an arcuate surface over which the said roller is adapted to travel, said surface being concentric with the axis of the oleo and having spaced apart cam portions for camming the roller and locking arm to withdraw the end of the latter from the notch to release the support for free swiveling movement with respect to the rudder.

9. In an aircraft, a fuselage, a rudder, a hinge connection between the fuselage and the rudder comprising an oleo cylinder attached to the fuselage and an oleo piston in the cylinder and having a swivel connection with the rudder, ground-engaging means including a support integral with the oleo piston, a cam attached to the rudder and having two lobes, a slidable plunger carried by the support and having a roller at one end, a spring tensioning said plunger to hold the roller between the lobes of the cam to connect the support to the rudder for steering the ground-engaging means through the rudder, and manually operated means for withdrawing the roller from the cam to disconnect the support from the rudder to allow the ground-engaging means to swivel freely with respect to the rudder.

10. In an aircraft, ground-engaging means for supporting the tail of the aircraft on the ground, an air rudder, said ground-engaging means and said rudder being movable longitudinally and angularly about a common vertical axis and being swiveled one to the other whereby either can turn independently of the other about the said axis, and separable interengaging elements on the said ground-engaging means and the said rudder respectively adapted by their interengagement to hold the said means and the said rudder against relative swivelling movement.

11. An aircraft having, in combination, ground-engaging means for supporting the tail of the aircraft on the ground, an air rudder, said means and said rudder being movable longitudinally and angularly about a common vertical axis and being swiveled one to the other whereby either can turn independently of the other about the said axis, and separable interengageable elements on the said ground-engaging means and the said rudder respectively and interengaging throughout a predetermined portion of the angular range of rudder movement for holding the said means and the said rudder against relative swivelling movement.

12. An aircraft having, in combination, a vertical rudder provided with an open cut-out in its lower portion; and means for supporting the tail of the aircraft on the ground and including a ground-engaging member rotatable about a horizontal axis, said means being swivelled to the said rudder for rotation independently of the latter about an axis in coincidence with the hinge axis of the rudder and being disposed in the said cut-out of the rudder with the axis of revolution of the ground-engaging member maintained in the plane of the lower edge of the cut-out so that at all times only about one-half of the said member protrudes below the rudder.

13. An aircraft having, in combination, a vertical rudder provided with an open cut-out in its lower portion centered on the rudder hinge axis, means for supporting the tail of the aircraft on the ground and including a ground-engaging member and a support in which said member is pivoted to rotate about a horizontal axis, said support being swivelled to the said rudder for rotation through 360 degrees about an axis in coincidence with the hinge axis of the rudder and being disposed in the said cut-out of the rudder with the axis of revolution of the ground-engaging member maintained substantially in the plane of the lower edge of the cut-out and a fairing for the ground-engaging member mounted on the support and complemental to the said cut-out to substantially fill the same with its side surfaces in the same planes as the corresponding surfaces of the rudder when the tail supporting means and the rudder are vertically aligned.

14. An aircraft having, in combination, a rudder movable longitudinally and angularly of a vertical hinge axis and provided in its lower portion with an open cut-out centered on the said hinge axis, means disposed in the cut out of the rudder and protruding below the latter for supporting the tail of the aircraft on the ground, a swivel connecting the said means with the rudder whereby any vertical movement of the said means will cause an equal movement of the rudder along its hinge axis, the said hinge axis and the swivel being co-axial to permit the said means to turn through 360 degrees with respect to the rudder, and a fairing on the said means and complemental to the cut-out to provide a continuation of the rudder surface.

HAROLD W. CASE.